US007007176B2

(12) United States Patent
Goodfellow et al.

(10) Patent No.: US 7,007,176 B2
(45) Date of Patent: Feb. 28, 2006

(54) SYSTEM AND METHOD FOR HIGHLY PHASED POWER REGULATION USING ADAPTIVE COMPENSATION CONTROL

(75) Inventors: Ryan Goodfellow, Mesa, AZ (US); Malay Trivedi, Phoenix, AZ (US); Kevin Mori, Chandler, AZ (US)

(73) Assignee: Primarion, Inc., Phoenix, AZ (US)

( * ) Notice: Subject to any disclaimer, the term of this patent is extended or adjusted under 35 U.S.C. 154(b) by 596 days.

(21) Appl. No.: 10/109,801

(22) Filed: Mar. 29, 2002

(65) Prior Publication Data

US 2002/0144163 A1 Oct. 3, 2002

Related U.S. Application Data

(63) Continuation of application No. 09/978,294, filed on Oct. 15, 2001, now abandoned, and a continuation-in-part of application No. 09/975,195, filed on Oct. 10, 2001, now abandoned.

(60) Provisional application No. 60/240,337, filed on Oct. 13, 2000, provisional application No. 60/239,166, filed on Oct. 10, 2000, provisional application No. 60/239,049, filed on Oct. 10, 2000, provisional application No. 60/238,993, filed on Oct. 10, 2000.

(51) Int. Cl.
*G06F 1/26* (2006.01)

(52) U.S. Cl. ...................... 713/300; 713/321; 323/283; 323/207

(58) Field of Classification Search ................ 713/300, 713/310, 320; 323/205, 266, 268, 269, 271, 323/283, 285; 363/13, 28, 148, 149, 157
See application file for complete search history.

(56) References Cited

U.S. PATENT DOCUMENTS

| | | | | | |
|---|---|---|---|---|---|
| 4,816,985 | A | * | 3/1989 | Tanahashi | 363/81 |
| 4,975,820 | A | | 12/1990 | Szepesi | |
| 5,177,677 | A | * | 1/1993 | Nakata et al. | 363/89 |
| 5,847,950 | A | | 12/1998 | Bhagwat | |
| 5,903,452 | A | | 5/1999 | Yang | |
| 5,969,513 | A | | 10/1999 | Clark | |
| 6,020,729 | A | | 2/2000 | Stratakos et al. | |
| 6,100,676 | A | | 8/2000 | Burstein et al. | |

(Continued)

FOREIGN PATENT DOCUMENTS

EP 732798 A1 * 9/1996

OTHER PUBLICATIONS

High Efficiency Low Voltage DC-DC Conversion for Portable Applications.

(Continued)

*Primary Examiner*—Thuan Du
(74) *Attorney, Agent, or Firm*—T. E. Galanthay

(57) ABSTRACT

A highly phased power regulation (converter) system having an improved control feature is provided. A controller, such as a digital signal processor or microprocessor, receives digital information from a plurality of power conversion blocks and transmits control commands in response to the information. The controller is able to change the mode of operation of the system and/or re-phase the power blocks to accommodate a dynamic load requirement, occasions of high transient response or detection of a fault. A compensation block within the controller is used to regulate the output voltage and provide stability to the system. In one embodiment, the controller is implemented as a PID compensator controller. In another embodiment, a microprocessor is able to receive feedback on its own operation thus providing enabling the controller to anticipate and predict conditions by analyzing precursor data.

26 Claims, 7 Drawing Sheets

U.S. PATENT DOCUMENTS

| | | | | |
|---|---|---|---|---|
| 6,160,441 | A | 12/2000 | Stratakos et al. | |
| 6,163,086 | A * | 12/2000 | Choo | 307/43 |
| 6,031,361 | A1 | 2/2001 | Burstein et al. | |
| 6,198,261 | B1 | 3/2001 | Schultz et al. | |
| 6,225,795 | B1 | 5/2001 | Stratakos et al. | |
| 6,628,716 | B1 | 7/2001 | Burstein et al. | |

OTHER PUBLICATIONS

Architecture and IC Implementations of a Digital VRM Controller.

Quantization Resolution and Limit Cycling in Digitally Controlled PWM Converters.

Wu .A M. et al; "Digital PWM Control; Application in Voltage Regulation Modules"; 30th Annual IEEE Power Electronics Specialists Conference; PESC 99; 1999; vol. 1, pp. 77-83.

Xiao J. et al.; "Architecture and IC Implementation of a Digital VRM Controller"; 32nd Annual IEEE Power Electronics Specialists Conference; PESC 2001; Jun. 17-21; vol. 1 of 4 Conf. 32; pp. 38-47.

Cooley G.M. et al.; "PWM and PCM Techniques for Control of Digitally Programmable Switching Power Supples"; 1995 IEEE Internationa Symposium on Circuits and Systems (ISCAS); Apr. 30 - May 3, 1995; vol. 2, Apr. 30, 1995; pp. 1114-1117.

Wei G-Y et al.; "A Fully Digital, Energy-Efficient, Adaptive Power-Supply Regulator"; IEEE Journal of Solid-State Circuits, IEEE Inc. New York, vol. 34, No. 4; Apr. 1999; pp. 520-528.

PCT International Search Report; PCT/US01/32263; Int'l Filing Date Oct. 15, 2001; Priority Date Oct. 13, 2000; 4 pgs.

G. Schmidt, Grundlagen der Regelungstechnik, Berlin, 1984, p. 275, 276.

* cited by examiner

SYSTEM AND METHOD FOR HIGHLY PHASED POWER REGULATION USING ADAPTIVE COMPENSATION CONTROL

CROSS REFERENCE TO RELATED APPLICATIONS

This application is a continuation of U.S. Ser. No. 09/978,294, filed on Oct. 15, 2001 now abandoned, the disclosure of which is hereby incorporated by reference.

This application includes subject matter that is related to and claims priority from U.S. Provisional Patent Application Ser. No. 60/240,337, filed on Oct. 13, 2000, entitled, "Adaptive Slope Compensation with DSP Control."

This application also includes subject matter that is related to and is a continuation-in-part of U.S. patent application Ser. No. 09/975,195, filed Oct. 10, 2001 now abandoned, entitled, "System and Method for Highly Phased Power Regulation" which claims priority from the following U.S. Provisional Patent Applications filed on Oct. 10, 2000: Ser. No. 60/238,993 entitled, "Multi Output Switching Power Converter with Optical I/O Microprocessor Control;" Ser. No. 60/239,049 entitled, "Multi Output Synchronous Power Conversion with DSP Control;" and Ser. No. 60/239,166 entitled, "Highly Phased Switching Regulator with DSP Control."

FIELD OF INVENTION

The present invention relates generally to power regulation systems and, in particular, to a highly phased power regulation system. More particularly, the present invention relates generally to a highly phased power regulation system using a compensation mode.

BACKGROUND OF THE INVENTION

Switching power converters (SPCs) are used to regulate the input voltage to a load. Often times, voltages are initially not suitable for a particular load (e.g., high AC) and must be downscaled (i.e., to a lower voltage) and/or converted (i.e., AC to DC rectified voltage) before applying to the load. In general, conventional SPC systems adequately provide voltage regulation to a load, however, there are drawbacks.

Traditional converter control methods are typically locked into one or two modes of operation (e.g., Pulse Width Modulation (PWM), constant ON time variable frequency, constant ON or OFF time and variable frequency, simultaneous phases ON, and simultaneous phases OFF). Depending on the particular load demands, utilizing one mode over another may improve control of the output voltage. Thus, a single operational mode converter typically cannot efficiently accommodate power delivery to complex or dynamic load requirements.

Slope compensation is often utilized in current mode power converters to stabilize the current loop. Conventional current mode controlled converters operating above 50% duty cycle need a compensating ramp signal superimposed on a current sense signal, which is used as a control parameter, to avoid open loop instability, subharmonic oscillations, and noise sensitivity. SPCs using current mode control typically include a pair of complex poles at half the regulator switching frequency and external ramp or slope compensation is added into the current loop in order to control the Q of these poles. In general, additional components are required to generate the fixed slope compensation in discrete applications.

It is common to couple more than one load to a power regulation system. In these multi-load/multi-output configurations, SPCs have traditionally required a separate controller or transformer with post regulators for each of the outputs. Each control unit requires compensating elements and support components which substantially increases the parts count for the converter. Additionally, in multi-output systems it is often desirable to include time synchronization to produce multi-phased outputs. These complex systems require precise management and control which, in general, the traditional purely analog converter systems cannot adequately manage. While transformers have shown some success in multi-output power conversion, these systems again typically require multiple controllers.

With the advent of increasingly complex power regulation topologies, more precise control of the switching elements (i.e. synchronous rectifiers) and better control methods have been attempted. Digital techniques for power converter control, specifically in multiphase designs, can improve precision and reduce the system's parts count. Digital control can also be upgraded for different applications of the same power system, e.g., for programmable feedback control.

Microprocessor loads vary greatly in current and generally require a high di/dt load transient current. For these applications, the power conversion system must be able to sense the current or voltage droop in order to correct for the load demand. Current sensing of the load is difficult and typically requires bulky, lossy and inaccurate methods. Voltage sensing has the disadvantage of lagging the current in the load. Delays in both methods can lead to inadequate response of the SPC.

Accordingly, an improved power regulation system is needed. In particular, a highly phased power regulation system having multi-mode capabilities over one or more loads is desired. More particularly, a versatile and adaptable power conversion and regulation system having an improved control feature is desired.

SUMMARY OF THE INVENTION

The present invention overcomes the problems outlined above and provides an improved power regulation system. In particular, the present invention provides a power regulation system (power converter) with an improved control feature. More particularly, the system and methods of the present invention allow for independent control of one or more outputs from a single controlling unit.

A power regulation system of the present invention includes a plurality of power conversion blocks in a multi-phased configuration, a controller, and a communication channel coupled there-between. Digital information is received at the controller from the power blocks. The controller includes an adaptive compensation algorithm which determines appropriate commands to be transmitted back to the power blocks. The controller may anticipate and predict forthcoming conditions and "set" the system into a predictive mode accordingly.

In one particular embodiment of the present invention, a highly phased power conversion system includes a proportional-integral-derivative (PID) compensation control method.

BRIEF DESCRIPTION OF THE DRAWINGS

These and other features, aspects and advantages of the present invention will become better understood with reference to the following description, appending claims, and accompanying drawings where:

DETAILED DESCRIPTION

The present invention relates to an improved power regulation system or power conversion system. Although the power converter disclosed herein may be conveniently described with reference to a single or multiphase buck converter system, it should be appreciated and understood by one skilled in the art that any basic switching power converter (SPC) or regulator topology may be employed, e.g., buck, boost, buck-boost and flyback.

Figure 1:
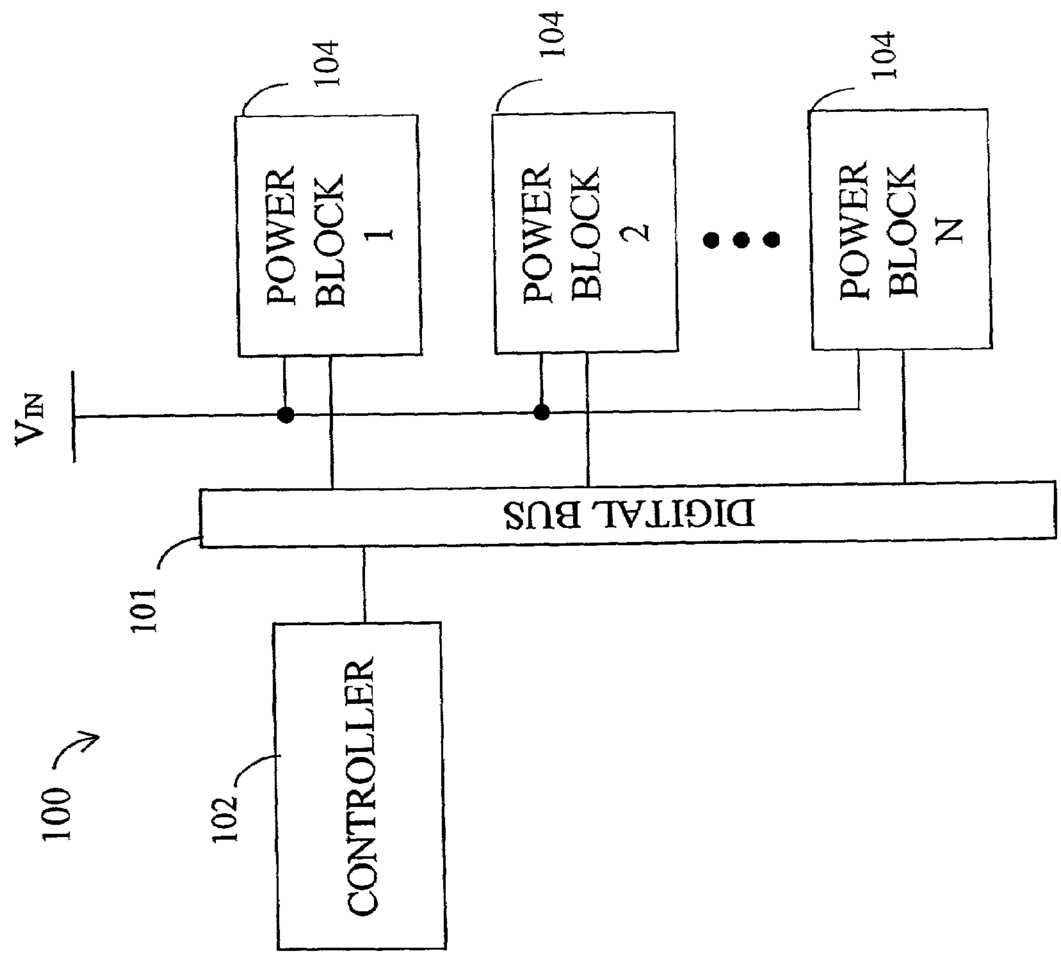
FIGS. 1–3 illustrate, in block format, a power regulation system in accordance with various embodiments of the invention.

FIG. 1 illustrates, in simplified block format, a power regulation system 100 in accordance with one embodiment of the invention. System 100 includes a digital communication bus 101, a controller 102 and a plurality of power blocks 104. System 100 may be implemented in any basic SPC topology. In the preferred embodiment, system 100 receives an input source voltage (VIN) and converts the voltage to a desired number of outputs, with each output at a desired voltage, in a highly efficient and reliable manner.

System 100 is expandable to many phases (i.e., "N" number of phases), allowing many different load levels and voltage conversion ratios. As shown, system 100 includes "N" number of power blocks 104 which may be limited only by the capabilities of the controller. For instance, in one particular embodiment, system 100 is configured to include eight single-phase converters ("blocks" or "channels"). Alternatively, in another embodiment, system 100 is configured to include one eight-phase converter.

Controller 102 receives and sends information to power blocks 104 via digital bus 101, or the equivalent. In general, the information communicated between the controller and the power blocks allows the system to precisely regulate the output voltage for any given load of the power block. In this manner, controller 102 independently controls multiple voltage outputs. This function will be described in further detail in the following description and accompanying Figures.

Figure 2:
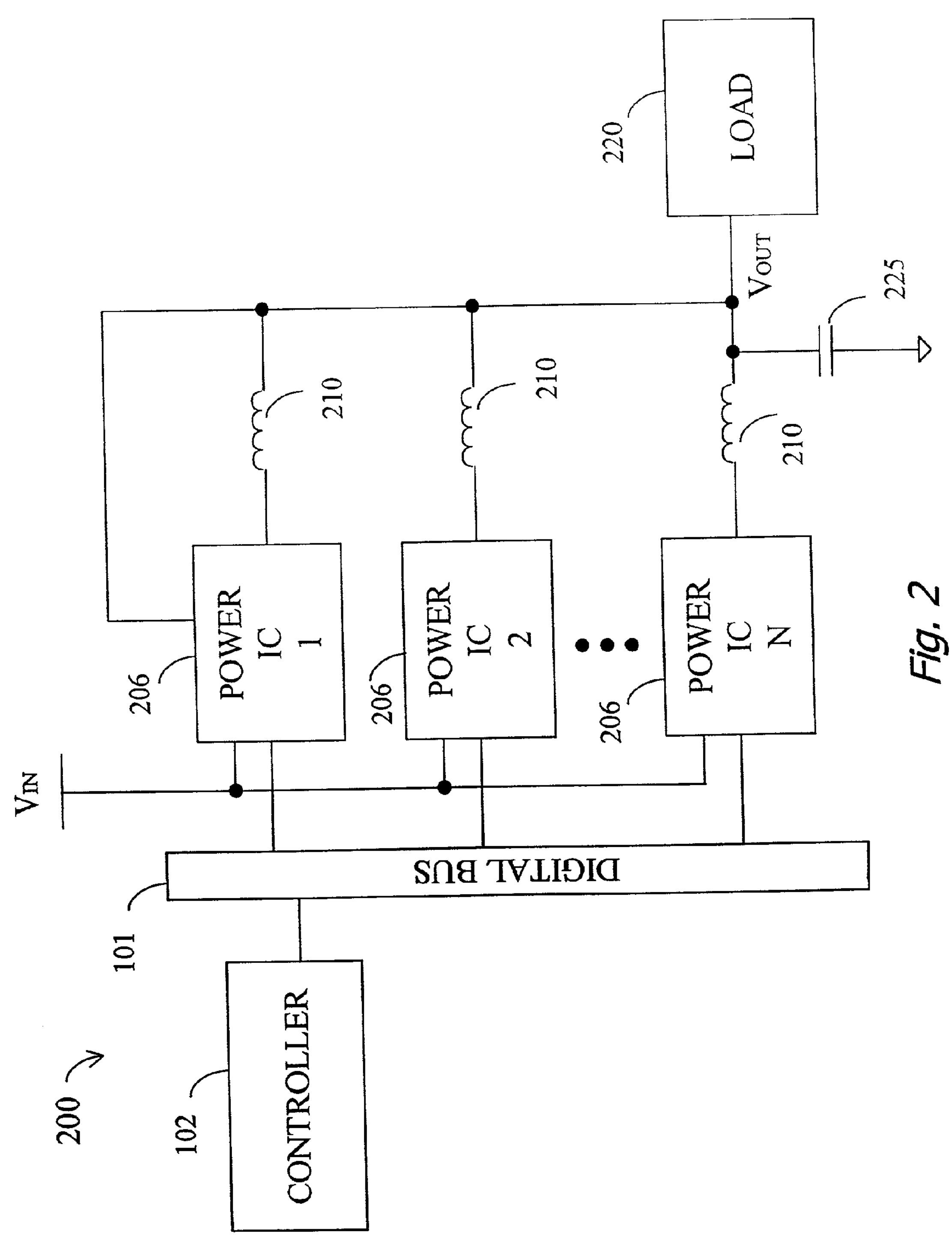

FIG. 2 illustrates, in block format, a power regulation system 200 in accordance with one embodiment of the invention. System 200 includes a digital bus 101, a controller 102, a plurality of power ICs 206, a plurality of output inductors 210, an output filter capacitance 225 and a load 220. System 200 is configured as a multiphase buck converter system; however, as previously mentioned, system 200 may be configured as any basic switching power converter (SPC) topology.

System 200 is suitably configured to output a single voltage (VOUT) to load 220. As such, system 200 may be considered a single output/single load system. Accordingly, the detailed discussion of the present invention begins with a very general topology (i.e., single output/single load); however, it should be recognized that FIG. 2 and the accompanying description is not intended to be limiting, but rather merely exemplary of one embodiment of the present invention. As such, each power IC 206 is configured to provide an output to load 220 in accordance with a predetermined voltage.

Generally, power ICs 206 are configured to alternately couple inductors 210 between the source voltage and a ground potential (not shown) based on control signals generated by controller 102. During transient load events, any number of output inductors 210 may be coupled simultaneously to either the voltage source or ground potential as needed by the load(s). In addition, the inductance of inductor 210 can vary depending upon input and output requirements. Capacitance 225 provides DC filtering of inductor currents and further acts as a charge well during load transient events.

During normal operation, each power IC 206 is preferably equally phased in time to minimize output ripple voltage to the load. Power ICs 206 share digital information between them and/or the controller such that each phase shares an equal part of the respective load current. Although each power IC 206 is illustrated as a stand-alone phase, each power IC may be implemented as any suitable number of distinct phases. The structural and functional aspects of power IC 206 are described in more detail below in FIG. 4.

Information relating to input/output characteristics of the power regulation system may be transmitted from various system elements to controller 102 in a suitable feedback loop. For example, controller 102 preferably receives digital information regarding mode of operation, output voltage, and output current from each power IC 206. In turn, controller 102 sends switch state information, such as pulse width and frequency information, to each power IC 206 to, for example, compensate for the demands of the load, the voltage source, and any environmental changes in order to maintain a constant voltage to the load. In this sense, controller 102 may include a digital signal processor (DSP), a microprocessor or any suitable processing means.

Preferably, controller 102 includes one or more algorithms to facilitate control of the system. As previously mentioned, power ICs 206 are suitably configured to transmit input/output information to controller 102 and the algorithms are suitably adaptive to the received information. In other words, controller 102 may modify the control algorithms in response to the received information. Since the control function may be stored in an algorithm, software code, or the like, modes of operation can be changed continuously during the operation of the system as needed, e.g., to obtain a faster transient response. In this manner, controller 102 may be programmed with recovery algorithms to effectively respond to sensed transient conditions at the regulated output. For example, in ATRH (active transient response high) and ATRL (active transient response low) modes, the controller includes instruction to align the high side or low side FETs on. This action provides a brief period of high di/dt through the power stage in order to respond to high di/dt load demands (e.g., a microprocessor load). Each power IC 206 is suitably configured to operate in any suitable control mode such as, Pulse Width Modulation (PWM), constant ON time variable frequency, constant ON or OFF time and variable frequency, simultaneous phases ON, and simultaneous phases OFF. In one particular embodiment, controller 102 includes one or more algorithms for providing predictive control of the particular system. For example, a suitable algorithm may be programmed to recognize signs or receive signals indicating a high load, current, or similar situation. The controller may then be able to set the power regulation system to an operational mode best suited for the anticipated condition.

In one embodiment of the present invention, a current sharing feature of the power ICs is included. In general, the power ICs may receive substantially equally power from the voltage source or a varied voltage may be supplied to each. A current feedback from each power IC to the controller (not shown) may be included forming a synchronized share line to facilitate balancing the currents between the blocks or power ICs.

Figure 3:
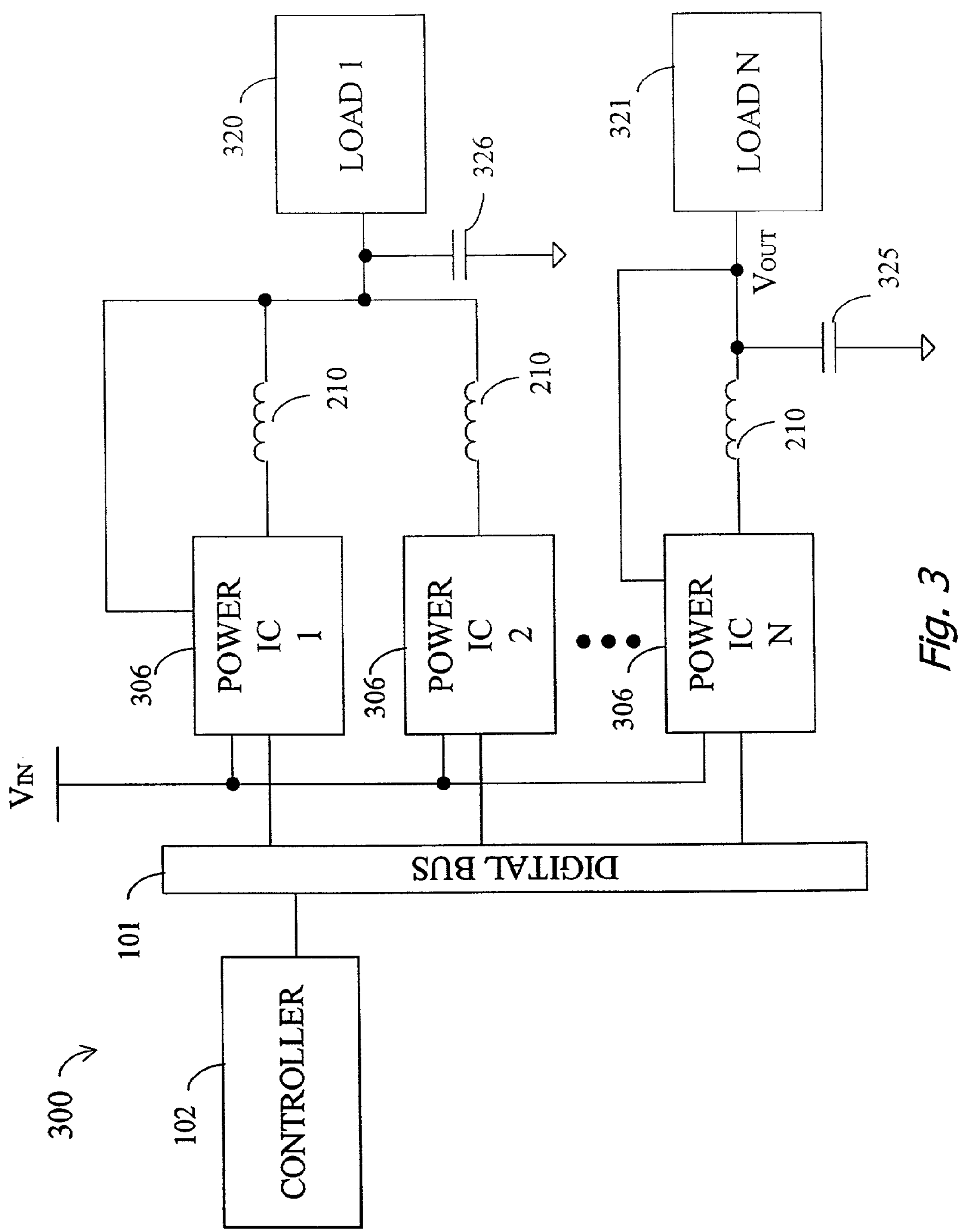

FIG. 3 illustrates, in block format, a power regulation system 300 in accordance with another embodiment of the invention. System 300 includes substantially the same system elements as system 200 (i.e., digital bus 101 and controller 102) except that system 300 includes a plurality of power ICs 306 and multiple loads 320–321. The operation of system 300 is substantially the same as previously described for systems 100 and 200 and thus will not repeated. In contrast, system 300 represents a multi-output/multi-load power regulation system. For example, power ICs 306 (labeled POWER IC 1 and POWER IC 2) are coupled to a single load 320 (labeled LOAD 1) and an output filter capacitance 326, and power IC 306 (labeled POWER IC N) is coupled to a second load 321 (labeled LOAD N) and an output filter capacitance 325. In this sense, load 320 receives a voltage input which is a combined voltage from two power ICs (VOUT 1). Controller 102 independently manages the operation of voltage input to multiple loads. It should be appreciated that any number of power ICs may be coupled together to provide regulated voltage to one or more loads. For example, load 320 is shown receiving inputs from two power ICs, however this is not intended to be limited in any way.

Figure 4:
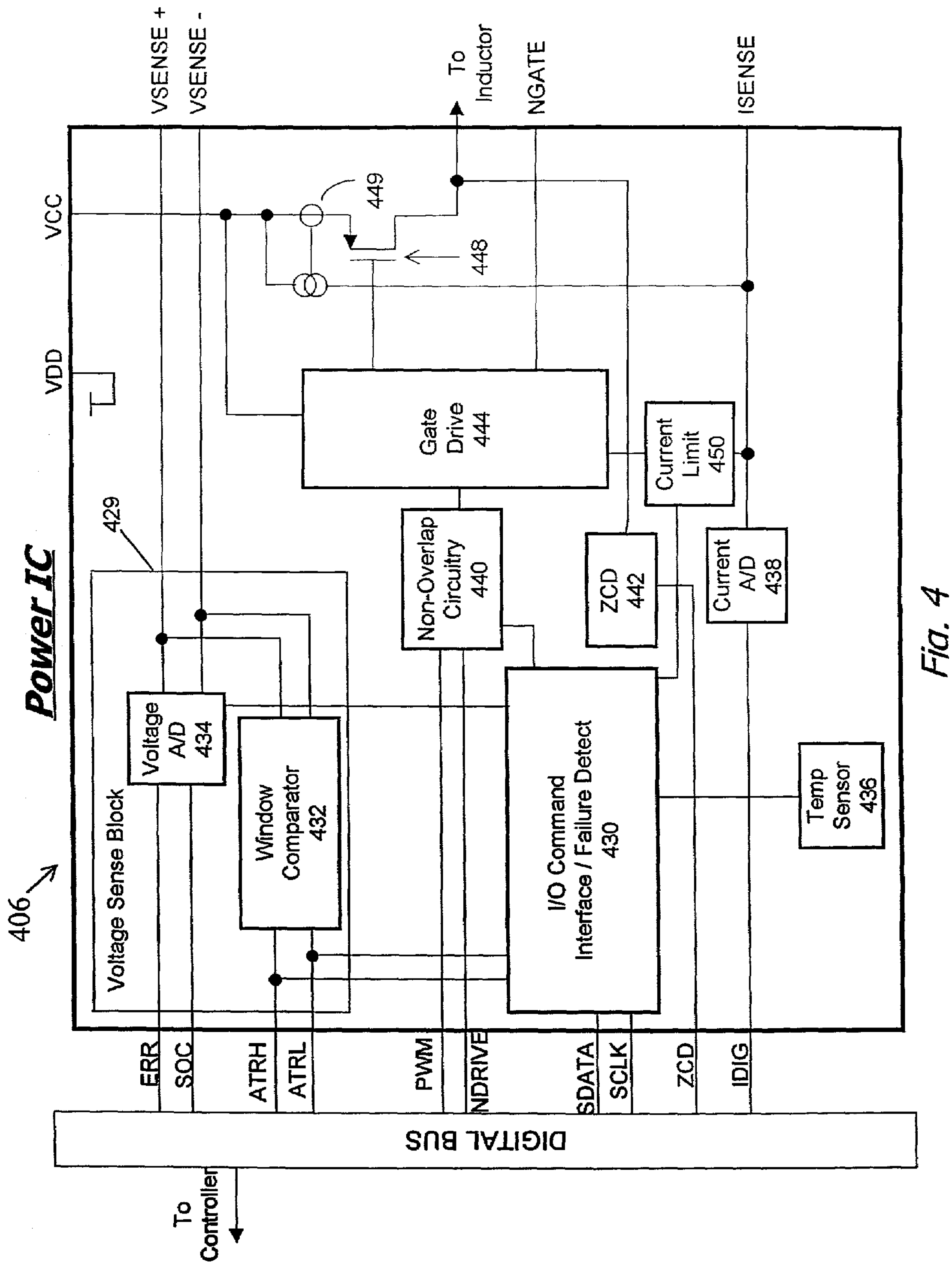
FIG. 4 illustrates, in block format, an exemplary power IC for use in a power regulation system of the present invention.

FIG. 4 illustrates, in block format, a power IC 406 in accordance with one embodiment of the present invention. Power IC 406 may be suitably implemented in a power regulation system of the present invention such as power IC 206,306, and is merely exemplary of one preferred embodiment. The general function of power IC 406 has been described previously for power ICs 206 and 306 and thus will not repeated entirely again; however, the functions of the major individual components comprising power IC 406 will be described below.

Power IC 406, in general, includes an integrated circuit (IC) having multiple pins for facilitating suitable connections to and from the IC. For example, power IC 406 may include an integrated, P-channel high side switch 448 and driver 444 as well as a low side gate driver 444. When used in conjunction with external N-FETs and an output inductor (e.g., inductor 210), power IC 406 forms a buck power stage. Power IC 406 is optimized for low voltage power conversion (e.g., 12 volts to approximately 1.8 volts and less) which is typically used in VRM (voltage regulator module) applications. The present embodiment of power IC 406 has particular usefulness in microprocessor power applications. Power IC 406 includes a voltage sense block 429, a command interface 430, a current A/D 438, a non-overlap circuit 440, a gate drive 444, a switching element 448, and a current limiter 450. Additionally, power IC 406 may include a current sense 449, a zero current detector 442, and/or internal protection features, such as a thermal sensor 436 and various other features which will be discussed below.

While controller 102 may be considered the "system controller" which effectively operates and manages each power IC within the system, as well as the system itself, command interface 430 includes circuitry and the like to function as a "power IC controller." In other words, command interface 430 may include a portion of the controlling functions of controller 102 as "on-chip" features.

Command interface 430 provides a suitable interface for routing signals to and from power IC 406. For most of the components of power IC 406, information from the individual component is routed to the controller through command interface 430. The information provided to the controller may include fault detection of a component or system, component or system updates, and any other pertinent information which may be used by the controller. Preferably, power IC 406 includes a fault register within command interface 430 which is polled by the controller. Command interface 430 also receives information from the controller which is distributed to the individual components of power IC 406 as needed.

In general, command interface 430 includes a serial bus interface. The serial bus is preferably of the type to write data into and may be programmed by the system user. For example, each power IC may be set at a predetermined voltage output level as needed for the corresponding load. In addition, the user may set an absolute window for the output voltage. The predetermined set information may then be used by command interface 430 to send "commands" or set levels to various other components of the power IC. For instance, the predetermined output voltage level (or an equivalent simulation) may be provided from command interface 430 to voltage sense block 429 for configuring comparison levels (the functions of voltage sense block and its components will be described in more detail below). Command interface 430 may also provide information to set "trip points" for current limiter 450 and optional temperature sensor 436. Various other system components may also receive commands, information, set levels and so forth, from command interface 430.

The power regulation system of the present invention utilizes various feedback loops to regulate the output voltage and manage current within the power converter. For instance, voltage sense block 429 is suitably configured to form a transient feedback loop. In particular, voltage sense leads from the load furnish the feedback loop with the input voltage supplied to the load. The components within the feedback loop or voltage sense block 429, perform comparisons and the like between the sensed voltage and a desired "set" voltage which is reported to command interface 430 and/or the controller. Voltage sense block 429 generally includes a voltage A/D 424 and a window comparator 432. In general, voltage A/D 424 communicates to the controller a digital difference between the set voltage and the input voltage and window comparator 432 communicates to the controller whether the input voltage is varied (too high or too low) from the set voltage.

Voltage A/D 434 may comprise a variety of electrical components coupled together to cause a voltage analog-to-digital (A/D) configuration as is commonly known in the industry. Voltage A/D 434 receives a constant reference voltage (not shown), a sample, or the equivalent, of the input voltage supplied to the load (via sense leads from the load), and the predetermined "set" voltage or desired output voltage from command interface 430. The voltage A/D 434 is configured to compare the load voltage with the set voltage and generate a digital representation of the absolute difference (i.e., positive or negative), if any, between the two voltages. The difference is then transmitted to the controller via digital bus 101. As shown, the transmission to the controller is a direct line, or pin connection; however, the transmission may be suitably routed through the command interface if needed. The controller determines if the input voltage to the load is within an acceptable range and if not, may transmit a command to the power IC (e.g., to command interface 430) to adjust the set voltage. Although not illustrated, it should be appreciated that sensed voltage from the load may be represented as a positive and a negative sensed voltage. In addition, the sensed voltage may be filtered prior to receipt at the power IC.

Window comparator 432 preferably comprises a high speed, low offset comparator configuration commonly available in the electrical industry. Window comparator 432 also receives the sensed voltage from the load in a similar manner as just described for voltage A/D 434 and receives the set voltage from voltage A/D 434 or, alternatively, from command interface 430 directly. Window comparator 432 suitably compares the two received voltages and transmits a signal ATRH (active transient response high) to the controller indicating a "high" or "low" sensed voltage.

For example, if the sensed or load voltage is lower than the set voltage, window comparator 432 may transmit an ATRH to the controller and in a like manner, if the sensed voltage is higher than the set voltage, window comparator 432 may transmit an ATRL (active transient response low) to the controller. As previously mentioned, the set voltage may include an absolute window which may or may not be considered by the window comparator depending on the desired precision of the particular application. The controller is suitably able to receive the ATR signals from window comparator 432 and either alone or in combination with the digital voltage and current information received, the controller may adjust the load voltage, set voltage, or other system components as needed to coordinate precise control of the output voltage.

Current A/D 438 may comprise a variety of electrical components coupled together to cause a current analog-to-digital (A/D) configuration as is commonly known in the industry. Current A/D 438 senses a very small fraction (e.g., $1/10{,}000$) of the input current through the high side power device and samples the voltage at the peak. Current A/D 438 converts the sampled voltage to digital format and transmits the data to the controller. The controller can determine the level of current in the sampled channel to preferably maintain current equilibrium between the two channels.

Current limiter 450 essentially comprises another comparator block having electrical components coupled together to cause a comparing structure and function. In general, current limiter 450 also receives a small fraction of the current from the source and compares the current levels between the source voltage and a reference. At a threshold level (which may include a set percentage of the peak channel current), current limiter 450 sends a signal to mode gating logic 444 which effectively turns a "high side" driver off. The current information is passed to the controller digitally via command interface 430. The controller may assess whether all or just a few channels were in current limit across a given fault polling cycle. Isolated, single channel current limit events may be ignored, but if the current limit is detected for a number of consecutive fault polling cycles, the controller may cease PWM to that channel and re-phase the system. If the controller detects that all or substantially all of the power ICs within the system are in current limit, then the system may be sent to the OFF state.

Gate drive 444 comprises system level logic to drive power IC 406 either high or low. For example, a pair of driver amplifiers or any suitable gain devices may be included.

Switching element 448 receives a signal from gate drive 444 which couples the output inductor to the input source or ground. In this sense, switching element 448 may include any suitable electrical device capable of performing a switching function such as, a bipolar transistor (BJT), field effect transistor (FET), metal oxide semiconductor (MOS, either N or P) and the like.

Non-overlap circuitry 440 prevents the high and low side drivers of mode gating logic 444 from conducting current simultaneously and may include logic gates and/or voltage comparators. Although not illustrated, it should be appreciated that non-overlap circuitry 440 may receive a high side signal (e.g., PWM) and a low side signal which may be utilized to implement various modes of operation. As previously mentioned, the system is uniquely versatile in that it can be operated in virtually any control mode of operation desired. Each mode of operation has advantages for control of the output voltage depending on the respective load demands. For example, in one embodiment a power regulation system of the present invention may be operated in continuous conduction mode (CCM) with external synchronous power FETs in continuous conduction regardless of the load current. In other words, negative current may be allowed to flow in the main inductor during light loads. In this embodiment, the standard PWM control may be performed via an input to non-overlap circuitry 440. In another embodiment, the system may be operated in discontinuous conduction mode (DCM) with the external synchronous power FETs turned off when the current reaches zero. In other words, a negative current may not be allowed to flow in the main inductor during light loads. The controller controls the OFF time of the low side switch in response to the ZCD signal.

In one embodiment, a power regulation system of the present invention includes a current sense mechanism 449. Current sense 449 detects the level of current by mirroring the level to an op amp. Identifying the input current levels can provide additional fault protection, help to monitor the power regulation, and other advantages to the system which may be best understood by referencing U.S. patent application Ser. No. 09/978,296, filed on Oct. 15, 2001 and entitled "System and Method for Current Sensing." The contents of which are incorporated herein by reference.

In another embodiment, a power regulation system of the present invention includes a zero current detect circuit (ZCD) 442. ZCD 442 detects when switching element 448 is low or effectively is switched to ground. In this sense, when a substantially zero current is detected, the operation of the system may be changed such that inefficiencies (e.g., due to high RMS currents) are minimized. Additionally, the system is able to respond more rapidly to low-to-high load transitions, resulting in less variations in the regulated output voltage. ZCD 442 may transmit notification of the zero current state directly to the controller via digital bus 101 or, alternatively, may supply the notice to command interface 430 for reporting to the controller. The detailed operation, structure and function of a suitable zero current detect may be best understood by referencing U.S. patent application Ser. No. 09/978,125, filed on Oct. 15, 2001 and entitled "System And Method For Detection Of Zero Current Condition," the contents of which are incorporated herein by reference.

In yet another embodiment, a power regulation system of the present invention includes one or more internal protection features. In one particular embodiment, power IC 406 includes a temperature sensor 436. Temperature sensor 436 may be, but is not limited to, an integrated solid state current modulating sensor or a thermistor. Temperature sensor 436 monitors the temperature of power IC 406 and periodically reports temperature readings to command interface 430. As previously discussed, command interface 430 preferably sets the temperature trip levels, high and low boundaries, and determines if the reading received from sensor 436 is outside the boundaries. If the temperature of the IC is above or below the predetermined "safety" temperatures (generally determined as levels just above or below a temperature which may cause damage to electrical circuitry, functioning, and the like, e.g., approximately 145° C. to 205° C.), then command interface 430 notifies the controller and in some situations, the controller may cease PWM to that channel and re-phase the system.

In another particular embodiment, another internal protection feature in power IC 406 is an under-voltage/over-voltage (UV/OV) protection mechanism (not shown). An input voltage protection comparator may be present in each power IC to protect the system from operating outside normal thermal and stability boundaries. The comparator senses the voltage across an input capacitor (not shown) to the VRM and if the input voltage lies outside a trigger level, the controller may pause the system.

In still another embodiment, an output UV/OV protection may be included (not shown) in a power regulation system of the present invention. One of the power ICs in the system may be assigned to UV/OV protection and suitably include a comparator for this purpose. The comparator senses the output voltage to ensure the voltage is within the safe operating range of the receiving load. The controller detects the condition through the command interface 430 and may transmit an OFF state to the system.

In still another embodiment, a power regulation system of the present invention includes a soft start mechanism to regulate the power-on voltage rise of the load. At the time of power-on, the system charges rapidly from its rest state to on-state so that it may provide the required load current at the set voltage level. A soft start mechanism provides yet another internal protection feature which prevents false failures and/or damage during initial power-on.

With combined reference to the previous Figures, controller 102 coordinates identification (ID) and phase assignment of the power ICs in the system. The controller may use PWM inputs and ZCD outputs to coordinate the ID assignment sequence. The controller tracks the number of power ICs available in the system by setting an internal time limit (e.g., 1 ms) for all power ICs to issue a ZCD high following a power-on reset. Active high on the ZCD pin indicates that the power IC is ready to receive an address and be counted in the system. The controller responds by setting the power IC in an "ID acquire" mode and pulls the PWM input to the power IC high. The ID is sent to the power IC and verified through the command interface. Following receipt of a valid ID, PWM is asserted low and the power IC is ready for active operation. The power ICs may be assigned IDs with or without VCC present, but in the latter case, an under-voltage fault may be registered. Preferably, the controller will not assert PWM signals to the systems until the power ICs are counted and assigned IDs, and the fault registers within the system have been checked.

In addition, controller 102 preferably manages the removal of damaged power ICs and the re-phasing of operational power ICs during a fault. In this manner, controller 102 recognizes the fault and makes the decision to remove an individual power IC from the system or, alternatively, shut down the system.

The controller 102 supports power IC identification to make the system scalable and addressing enables channel dropping and re-phasing for certain failure modes. In one particular embodiment, the address of each power IC in the system is suitably communicated through command interface 430. The controller uses the available number to determine the relative phase relationship between the power IC channels.

It should be appreciated that while not illustrated on FIG. 4, various other components may be suitably included and recognized by those of skill in the art as common structures of an electrical device. For example, a clean clock may be received at command interface 430, a start-of-conversion signal may be received at voltage A/D 434 to initiate the A/D, and a clock, generated by, for example, an off-chip crystal oscillator, may be received at a pin on the chip as is common in electrical chip configurations.

Figure 5:
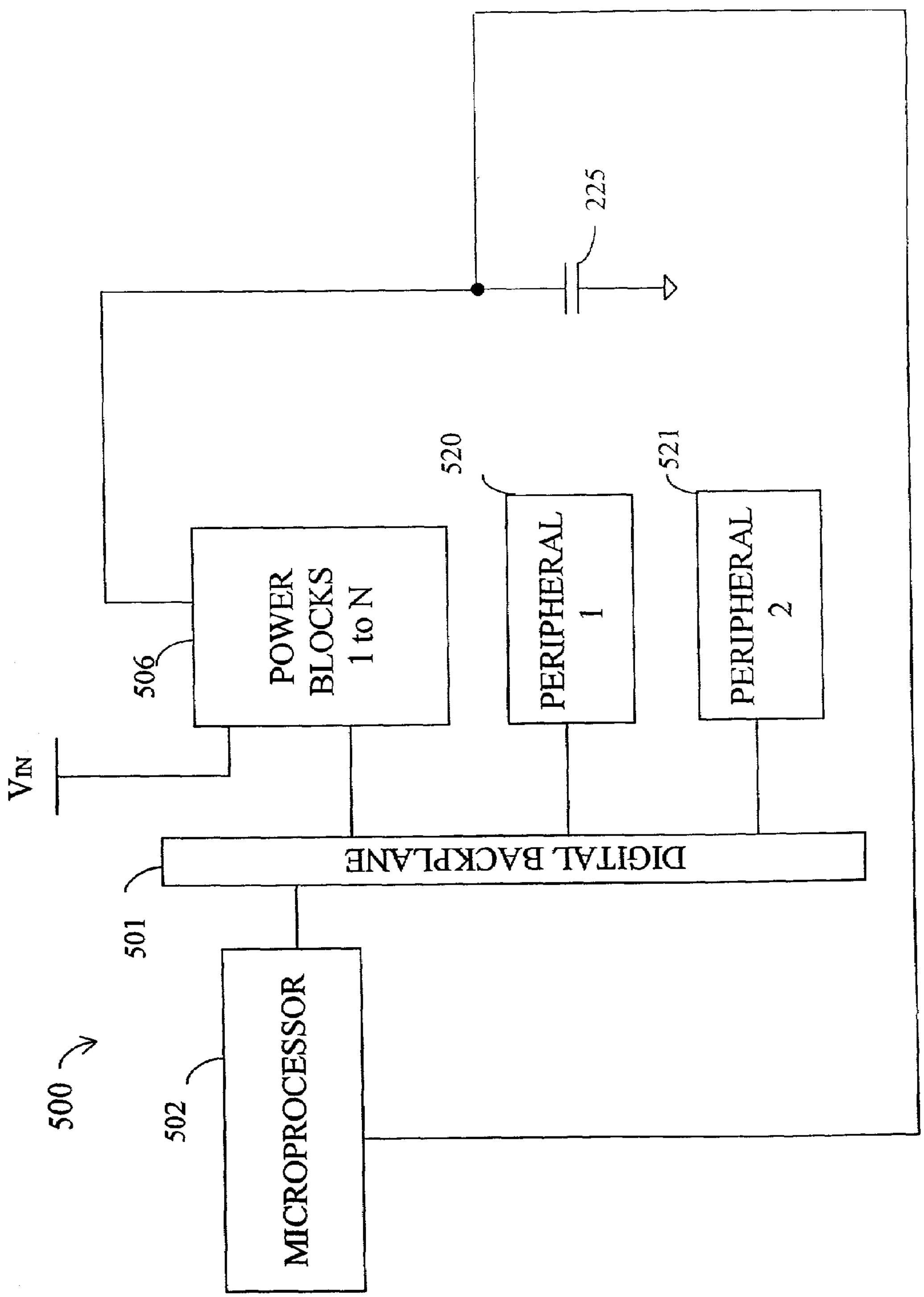
FIG. 5 illustrates, in block format, a power regulation system in accordance with yet another embodiment of the invention.

FIG. 5 illustrates, in block format, a power regulation system 500 in accordance with yet another embodiment of the present invention. System 500 includes a backplane 501, a microprocessor 502, a plurality of power blocks 506, an output filter capacitance 225, and a plurality of peripherals 520, 521. The present embodiment of the invention (as well as various other embodiments) is configured to adapt to multi-modes of operation, which advantageously permits the system to optimize the mode of operation to suit the demands of the individual load(s). The present invention may be particularly suited to power high-current low-voltage loads, such as microprocessors, and thus the present embodiment may be conveniently described in that context. It should be appreciated that this is only one particular embodiment and is not intended to be limiting on the scope of the invention. Moreover, the previously described embodiments may suitably include some or all of the following elements, in particular, the previous embodiments may include a microprocessor load.

Backplane 501 is preferably a multifunctional digital backplane such as an optical backplane or the like, that facilitates data transmission between microprocessor 502, power blocks 506 and peripheral devices 520, 521. For example, voltage regulation control algorithms may be transferred from microprocessor 502 to any or all of the power ICs within each power block 506 via backplane 501. Power is transferred through power blocks 506 to microprocessor 502 and peripherals 520, 521.

Microprocessor 502 may be similar to controller 102, however, this particular embodiment is especially suited for a microprocessor controller. For example, the microprocessor may be itself a load of the system and thus provide feedback on its own operation. In this manner, the microprocessor receives input from various other system components, such as the power ICs, peripherals, other loads, as well as data relating to its own processes. A suitable algorithm within the microprocessor may be programmed to compile, sort and compute the received data to determine the "state" of the overall system. For example, during pre-periods of high load, high current, or various other situations, the microprocessor could suitably anticipate and predict the forthcoming situation by analyzing the "warning" signals or precursor data. In this sense, the microprocessor can set the power regulation system into a predictive control mode as needed.

Power blocks 506 are similar in structure and function as previously described power blocks 104, power ICs 206, 306 and 406. Of course, in this particular embodiment, the power ICs may send and receive data via backplane 501 and/or digital bus 101.

Peripherals 520, 521 may be internal or external interfaces to electrical equipment coupled to the power regulation system. For example, interfaces to monitors, printers, speakers, networks and other equipment may be coupled to the system via backplane 501.

Figure 6:
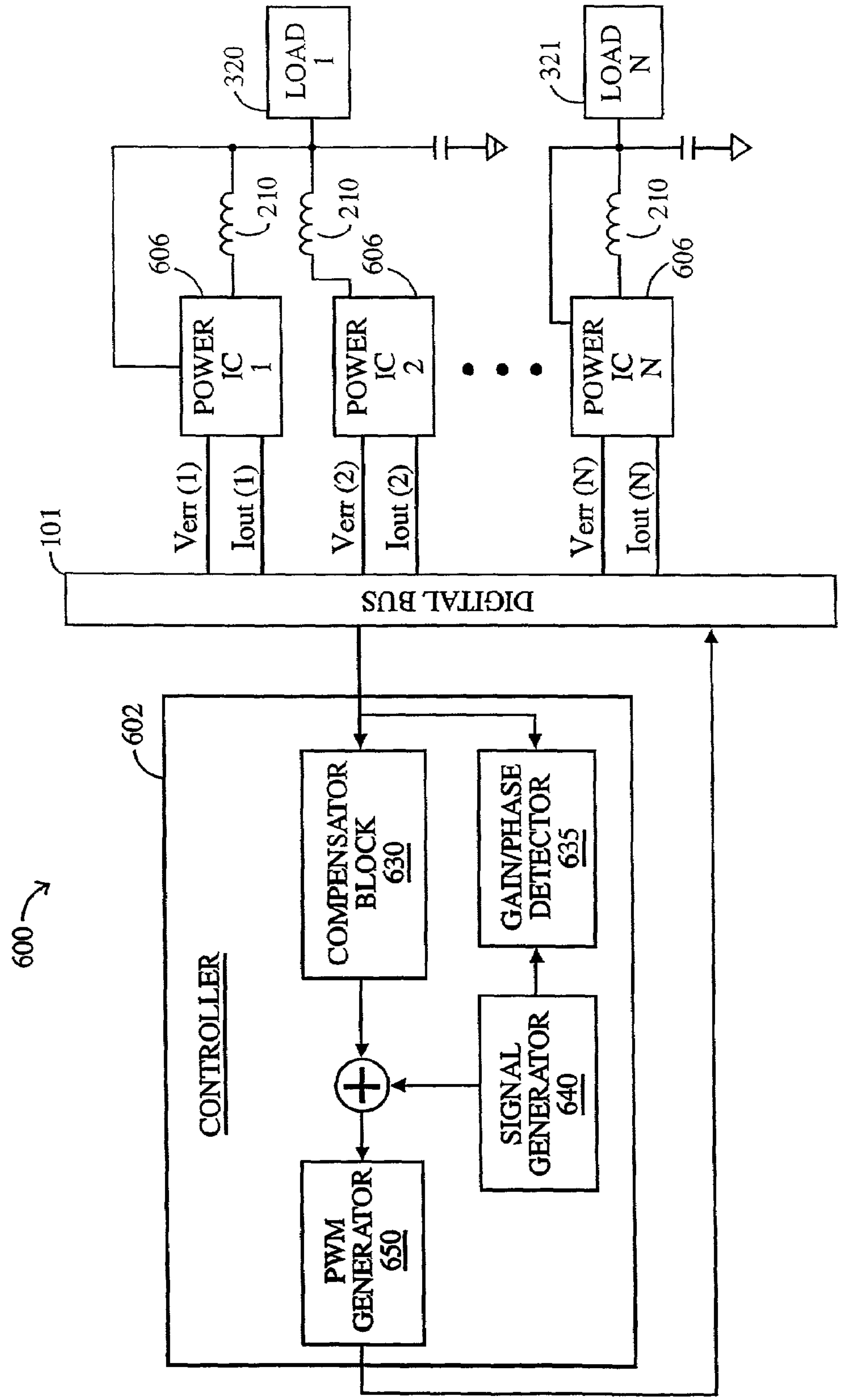
FIG. 6 illustrates, in block format, a power regulation system having a compensation control feature in accordance with an embodiment of the invention.

FIG. 6 illustrates, in simplified block format, a power regulation system 600 having an exemplary compensation control in accordance with one embodiment of the invention. Power regulation system 600 is similar to the previously described power regulation systems (e.g., systems 100–300 and 500) except that system 600 includes a compensation control feature. System 600 includes a plurality of power ICs 606, a plurality of output inductors 210, a plurality of loads 320, 321, a digital bus 101, and a controller 602. It should be noted that like reference numerals represent similar elements throughout the Figures. In this illustrative embodiment, each power IC 606 transmits a digital representation of the voltage error ($V_{err}$) determined by the power IC and the channel current ($I_{out}$) from the power IC. As previously mentioned, the voltage error is the absolute difference, as determined by the voltage sense block (e.g., voltage sense block 429 and voltage A/D 434), between the sensed output (load) voltage and the set voltage. A digital representation of the difference ($V_{err}$) is communicated to controller 602 via digital bus 101. In this manner, each power IC (1 thru N) determines a voltage error and transmits the difference, if any, to the controller. Each power IC 606 also transmits a digital representation of the current (or the equivalent) ($I_{out}$) in the sampled channel of the power IC to controller 602. It should be recognized that various other inputs and outputs to the power ICs occur, although not illustrated for purposes of this embodiment.

Controller 602 is similar in function as the previously discussed controllers (e.g. controller 102) except that an exemplary compensation control feature has been included. It should be realized that various other features of controller 602 are present, although not illustrated for purposes of this embodiment. As will be discussed in further detail below, algorithms may be programmed to carry-out the desired functions of the compensator and as such, the various blocks illustrated in controller 602 may be included in a suitable algorithm or the like. Controller 602 includes a compensation control feature which broadly includes a compensator block 630, a gain/phase detector 635, a signal generator 640, and a PWM generator 650.

There are numerous methods of compensation which are suitably adaptive to control systems such as power regulation system 600. Generally, in closed-loop control systems, compensation processes may be introduced to modify the system in such a way that the compensated system satisfies a given set of design specifications.

In a single-loop control system, the transfer function is:

$$T(s) = \frac{C(s)}{R(s)} = \frac{G_c(s)G_p(s)}{1 + G_c(s)G_p(s)H(s)} \tag{1}$$

where: R(s) equals the input and C(s) equals the output. The characteristic equation is:

$$1++G_c(s)G_p(s)H(s)=0 \tag{2}$$

where: $G_c(s)$ is the compensator transfer function, $G_p(s)$ is the plant transfer function, and H(s) is the sensor transfer function. By way of reference, the plant is the system to be controlled and the compensator provides the excitation for the plant.

The compensator transfer function is designed to give the closed-loop system certain specified advantageous characteristics. The compensator can be designed to improve the transient response. Increasing the speed of response is generally accomplished by increasing the open-loop gain at higher frequencies such that the system bandwidth is increased. Reducing overshoot (ringing) in the response generally involves increasing the phase margin of the system, which tends to remove any resonance in the system. The phase margin of the system determines the transient response, output impedance and other performance characteristics of the SPC (switching power converter). A trade-off typically exists between the beneficial effects of increasing the open loop gain and the resulting effects of reducing the stability margins. Hence, increasing the relative stability tends to increase phase and gain margins and generally decrease the overshoot in the system response.

The compensator can also be designed to reduce the steady-state error. Steady-state errors are typically decreased by increasing the open-loop gain in the frequency range of the errors. Low frequency errors are typically reduced by increasing the low frequency open loop gain and by increasing the type number of the system (the number of poles at the origin in the open loop function.

Compensator block 630 receives the voltage error and channel currents from the individual power ICs 606. This data is used to optimize the compensator transfer function as needed to regulate the output voltage to the load(s) and provide stability to the system. Output voltage regulation typically involves minimizing the voltage error (i.e., reducing the absolute difference between the sensed (load) voltage and the set voltage) and providing active voltage positioning based on the load level.

During start-up (e.g., at a power-on-reset, initial power-on, power IC re-phasing, or the equivalent), a start-up control loop including gain/phase detector 635 and signal generator 640 is engaged. The data input to compensator block 630 is also received at gain/phase detector 635 where the gain and phase of the output voltage may be determined. Signal generator 640 provides a constant reference, such as a sinusoidal waveform, to gain/phase detector 635. The overall gain of the plant transfer function may be determined by equating the ratio of the absolute magnitude of a feedback signal with respect to the sinusoidal signal. The following equation exemplifies a suitable gain equation:

$$\text{Gain} = 20\log\left(\frac{\sqrt{B_{\cos}fb^2 + B_{\sin}fb^2}}{\sqrt{B_{\cos}ref^2 + B_{\sin}ref^2}}\right) \tag{3}$$

where: fb is the feedback signal and ref is the injected sinusoidal signal.

The following equation exemplifies a suitable phase equation:

$$\text{Phase} = \arctan\left(\frac{B_{\cos}fb}{B_{\sin}fb}\right) - \arctan\left(\frac{B_{\cos}ref}{B_{\sin}ref}\right) \tag{4}$$

The start-up control loop is used to optimize the initial compensator transfer function and then the start-up loop may be disengaged until subsequent start-ups occur.

PWM generator 650 receives the initial instruction, such as from the start-up control loop, or the compensated instruction and in response, generates a digital signal to the power ICs. It should be noted that controller 602 provides digital instructions to more than one power IC and, in fact, controller 602 may provide instructions to all the power ICs in the system.

In one embodiment of the invention, a power regulation system in accordance with the present invention includes a controller 602 for operating the system in current mode control. Algorithms contained within controller 602 suitably implement adaptive slope compensation to optimize system performance. For example, the slope compensation may be calculated to vary optimally as a function of the load. In this embodiment, the current A/D (e.g., current A/D 438) provides information to controller 602 in a format that can be suitably multiplied by a gain term to provide adaptive slope compensation. The sensed analog current signal is transmitted to the controller logic. A variable multiplier is then used to increase the sensed current signal. The gain term may be programmed to vary as a function of load or variances resulting from other external components (e.g., output filter).

Figure 7:
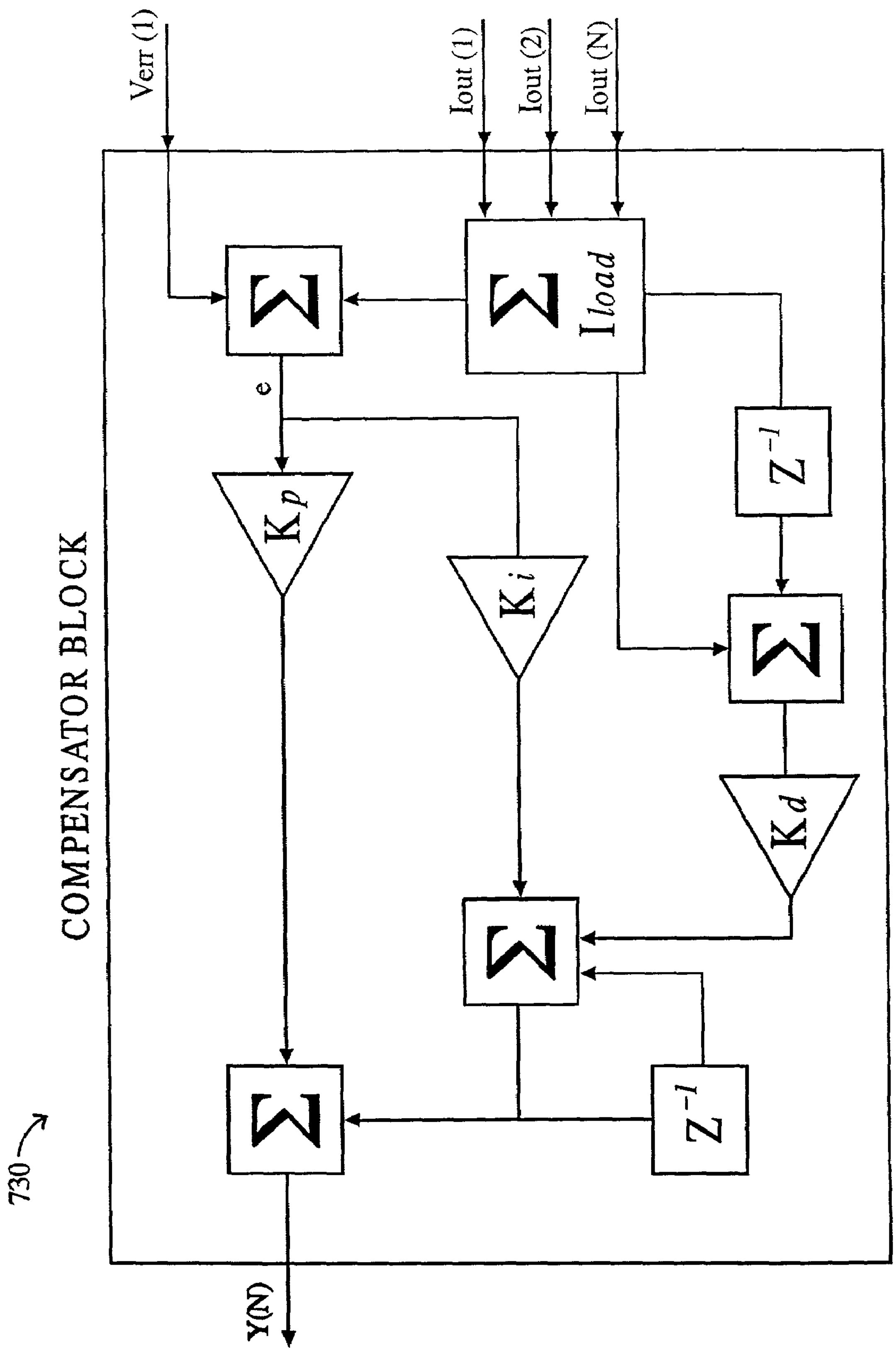
FIG. 7 illustrates an exemplary PID compensation block in accordance with the present invention.

FIG. 7 illustrates, in simplified block format, a compensator block 730 for use in controller 602 in accordance with one embodiment of a power regulation system of the present invention. Compensator block 730 represents an exemplary proportional-integral-derivative (PID) compensator control loop. The transfer function of the PID controller may be represented as:

$$G_c(s) = K_p + \frac{K_i}{s} + K_d s \qquad (5)$$

where: $K_p$ is the proportional gain, $K_i$ is the integral gain, and $K_d$ is the derivative gain.

The coefficients of the terms of Equation 5 may be determined on the basis of the plant transfer function, for example, as derived using Equations 3 and 4 above.

The net error input to compensator block 730 is the sum of the $V_{err}$ and $I_{out}$ inputs. For example, the voltage error for each power IC is received at the compensator block and the sum of all the total currents output by the power ICs ($I_{LOAD}$) is received at the block. The individual $I_{out}$ from each of the power ICs is summed together to determine the total current output to the load ($I_{LOAD}$) The load current ($I_{LOAD}$) and voltage error are then summed to determine the error signal (e). The error signal is passed through a proportional gain ($K_p$) and an integral gain ($K_i$) path and offset by differential gain ($K_d$) to generate the output (y(n)).

The digital output (y(n)) at any time (n) is a function of the present digital input (x(n)) and the previous digital output (y(n−1)). The proportional (P) and integral (I) relationships to the input and output may be represented as the following Equations 6 and 7, respectively:

$$y(n)=K_p x(n) \qquad (6)$$

$$y(n)=K_i(x(n)+y(n-1)) \qquad (7)$$

The output of compensator block 730 is the sum of Equations 6 and 7. In general, the proportional controller ($K_p$) has the effect of reducing the rise time and will reduce, but not eliminate, the steady-state error. The integral controller ($K_i$) has the effect of reducing, even eliminating, the steady-state error.

A load step is typically followed by a steep change in the $V_{err}$ and $I_{out}$ inputs. The PI compensator stages are unable to respond immediately to the change and usually takes some time to adjust to the new load conditions. In these situations, the derivative term (D) is used and may be represented as:

$$y(n)=K_d(x(n)-x(n-1)) \qquad (8)$$

However, a high derivative term may have an adverse influence on steady-state performance. It is preferably to shift the compensator output to the new value corresponding to the load condition. Such a scheme bypasses the ramping time of the PI block and retains the steady-state stability provided by the PI block. FIG. 7 illustrates this offset preferred response. The differential gain ($K_d$) is assigned to the $I_{out}$ signal such that the compensator output is substantially instantaneously shifted by an amount proportional to the change in the load (or other effects resulting in a change in the compensator inputs). In this manner, the differential offset may be active only when there is a change in the load current. The PI block resumes when the load current achieves the new compensated value. This adaptive control feature allows compensator block 730 to rapidly adjust the compensator output to attain a new steady-state condition after a load step.

In general, it is still desirable to include a residual differential term ($K_d$) even during steady-state to maintain system stability. However, the optimum value of $K_d$ may be much lower than the best value for step load response. Compensator block 730 accounts for this by adaptively adjusting the value of $K_d$ depending on the load activity. Thus, a high $K_d$ value may be used during a load step and the value may be progressively reduced to the steady-state residual level as the load activity lessens. This adaptive digital control on the compensation system greatly enhances the transient response of the power regulation system without jeopardizing the steady-state response.

During a load step, the controller can rapidly change the output of the compensator by utilizing the sensed load current. The output of the compensator is offset by an amount proportional to the change in the sensed load current. The gain of the difference stage ($K_d$) changes adaptively with the sensed current to provide a bigger offset for large load steps. This allows the compensator to quickly arrive at the output signal corresponding to the new load current, thus reducing the time required by conventional compensators to reach steady state.

In one particular embodiment, an algorithm to adaptively compensate for varying loads utilizes a calibration procedure to provide information to the controller, such as the characteristics of the output inductors, output capacitors and the load(s). This calibration procedure involves injecting a sweeping frequency sinusoidal waveform into the portion of the controller that computes the PWM duty ratio. The feedback voltage and individual inductor current signals are input into the digital feedback loop where the signals are analyzed to determine the residual amount of the injected sinusoid.

In another embodiment, the value of $K_p$ is such that it raises the low-frequency flat-band gain to 20 dB and the value of $K_i$, which determines the low-frequency gain of the system, is such that the overall loop gain is 20 dB about an octave below the 3 dB frequency of the original plant transfer function. The parameter $K_d$ influences the high-frequency response of the system and determines the gain crossover frequency of the loop transfer function. An iterative algorithm is used to incrementally adjust the $K_d$ compensation to maximize the gain crossover frequency and the phase margin.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The present invention has been described above with reference to exemplary embodiments. However, those skilled in the art having read this disclosure will recognize that changes and modifications may be made to the embodiments without departing from the scope of the present invention. For instance, the present invention has been described with a single controller to manage/control the power regulation to one or more loads; it should be recognized, however, that more than one controller may used to manage/control multiple loads within the system depending upon the particular requirements and limitations of the system. Moreover, it should be appreciated that all three controller coefficients (P-I-D) need not be implemented. For example, if a PI system provides the desired response, then it may not be necessary to implement the derivative (D) controller. These and other changes or modifications are intended to be included within the scope of the present invention, as expressed in the following claims.

The invention claimed is:

1. A power regulation system coupled to an input source voltage (Vin) and an output voltage (Vout), said Vout electrically coupled to a load, the system comprising:

a plurality of power conversion blocks in a multi-phase configuration, each block electrically coupled to said Vin at a power IC and coupled to said Vout at an output inductance, said power IC including a command interface having read/write capabilities for storing data;

a controller in communication with and providing an instruction to each of said power conversion blocks, said controller having an adaptive algorithm configured to receive digital power conversion data from said blocks and to determine a power compensation from said data, said power compensation comprising a proportional-integral-derivative (PID) control algorithm and modifying said instruction to each of said power conversion blocks; and a digital bus providing a communication channel between said plurality of power conversion blocks and said controller.

2. The power regulation system of claim 1, wherein said controller comprises one of a digital signal processor (DSP) or a microprocessor.

3. The power regulation system of claim 1, further comprising a current feedback line between each of said power conversion blocks and said controller to facilitate current balancing.

4. The power regulation system of claim 1, wherein said command interface of said power IC further comprises a fault register.

5. The power regulation system of claim 4, wherein said controller periodically polls said fault register via said digital bus to determine if a fault within said power IC has occurred.

6. The power regulation system of claim 1, wherein each of said power ICs comprises an identification (ID) as assigned by said controller.

7. The power regulation system of claim 1, wherein said power compensation comprises an adaptive slope control algorithm for peak current mode control.

8. The power regulation system of claim 1, wherein said PID control algorithm comprises a proportional gain ($K_p$), an integral gain ($K_i$), and a differential gain ($K_d$).

9. The power regulation system of claim 8, wherein said PID control algorithm further comprises an error signal.

10. The power regulation system of claim 9, wherein said error signal comprises a summation of said digital power conversion data from said power conversion blocks.

11. The power regulation system of claim 9, wherein said error signal comprises a summation of a voltage error and a load current.

12. The power regulation system of claim 9, wherein said instruction is offset by said ($K_d$).

13. The power regulation system of claim 12, wherein said instruction is offset during a load step.

14. A power regulation system as in claim 1, wherein said power IC comprises:

a voltage sense block for sensing an input and including a window comparator for providing either an active transient response high output or an active transient response low output.

15. A method of compensation control in a multi-phased power regulation system, said method comprising the steps of:

receiving, at a controller, a plurality of digital information from each of a plurality of power conversion blocks in a multi-phase configuration, said information comprising a net error;

optimizing a set of coefficients of a compensation transfer function in response to said received digital information by modifying said set of coefficients to compensate for system changes; and transmitting control information from said controller to each of said power conversion blocks in response to said optimizing step.

16. The method of claim 15, wherein said optimizing step comprises optimizing a proportional gain ($K_p$), an integral gain ($K_i$), and a differential gain ($K_d$).

17. The method of claim 16, wherein said optimizing step further comprises forming a PI block comprising said ($K_p$) and said ($K_i$), and forming a D block comprising said ($K_d$).

18. The method of claim 17, wherein said optimizing step further comprises offsetting said PI block by said D block during a load step.

19. The method of claim 16, wherein said optimizing step further comprises increasing said ($K_d$) and decreasing said ($K_i$) to increase a transient response of said system.

20. The method of claim 16, wherein said optimizing step further comprises decreasing said ($K_d$) and increasing said ($K_i$) to increase a steady-state response of said system.

21. The method of claim 15, wherein said controller comprises a digital signal processor (DSP) and said receiving step occurs at said DSP.

22. The method of claim 15, further comprising the step of forming a synchronized current share line between said controller and each of said power conversion blocks.

23. The method of claim 15, further comprising the step of addressing each of said power conversion blocks.

24. The method of claim 23, further comprising the step of determining a number of available power conversion blocks in response to said addressing step.

25. The method of claim 23, further comprising the step of determining a relative phase relationship between a plurality of channels in response to said addressing step.

26. A method of proportional-integral-derivative (PID) compensation control in a highly phased power conversion system, said system having a voltage input and a voltage output, said voltage output received at a load, method comprising the steps of:

comparing a voltage output from a power conversion block to a predetermined voltage to determine a voltage error;

converting said voltage error to a digital representation of said voltage error;

converting a current received at said load to a digital representation;

determining a net error from said voltage digital representation and said current digital representation;

receiving said net error at a PI block of said compensation control;

receiving said current digital representation at a D block of said compensation control;

offsetting said PI block with said D block during a load change;

determining a set of PID coefficients in accordance with static and transient conditions of said system;

outputting a compensated instruction in response to said PI and said D blocks; and modifying said voltage output in response to said compensated instruction.

* * * * *